Patented Nov. 23, 1948

2,454,506

UNITED STATES PATENT OFFICE 2,454,506

COMPOSITION OF RUBBERLIKE QUALITIES

Albert C. Fischer, Chicago, Ill.

No Drawing. Application January 6, 1943,
Serial No. 471,503

5 Claims. (Cl. 260—758)

This invention relates to asphaltic compositions having rubber-like qualities.

It is the object of the present invention to provide a bituminous or asphaltic composition incorporating rubber or resinous material therein to attain a compound characterized by a high degree of yieldability, elasticity, cohesive force and the capability of tenacious adhesion therebetween and adjacent bodies of the same or different materials.

It is particularly the object of the invention to provide a bituminous and rubber composition possessing a high degree of elasticity which is effective at extremely low temperatures and particularly temperatures below the freezing point, such as from 0° to 15° F.

It is a further object of the invention to provide as asphaltic composition, preferably having rubber incorporated therein in a minor proportion, together with a plasticizing agent, a mineral filler and a flow retarding agent, which ingredients are compounded in such a manner as to produce a homogeneous product having the texture of licorice sticks, which may be distended when pulled, but which in contradistinction to conventional bituminous rubber mixtures, has marked restoring forces which render the composition ideally suited to expansion joint uses. Aside from the strong cohesive force existing between the molecules of the composition, to produce a yieldable and highly elastic substance, the material has a tacky texture which is effective in adhesively engaging bodies of other materials such as concrete, metal and wood to adhere thereto in the course of following the movements of these materials as is the case of expansion joints. Also the waterproof sealing joints obtainable with this material render it useful in the field of contraction joints.

It is a further object of the invention to provide a composition which is described above, which may be cut with suitable solvents and emulsifying agents to produce waterproofing coatings and emulsions such as paints, damp-proofing compounds and the like.

One of the principal advantages of the present invention is the retention of the properties of the material described above, such as yieldability, elasticity, adhesive tenacity, waterproofness, etc. at freezing temperatures, at which such products normally become brittle and lose their efficacy in the applications for which such materials are used.

The material in accordance with the present invention may be formed or extruded, or molded into different shapes which are particularly adapted to expansion joints and keying means used in connection with such joints. The same may also be used in large masses which may be liquefied by the application of a controlled amount of heat thereto preparatory to the pouring thereof into expansion joints or other molded forms. The melting point of the material ranging from 400 to 428° F. is approximately 100° lower than the similar compositions of the prior art. This material is particularly useful in the field of expansion joints by virtue of its capability of sealing the joint against the ingress of water to the subsoil of a pavement or roadway which is effective under all temperature conditions and which is capable of being restored to its original state and position upon the recurrence of normal temperatures. Its capability of maintaining a bond at the jointing surface thereof to the pavement sections after the melted composition is poured into the joint and is permitted to harden assures the maintenance of the integrity of the expansion joints in which the same is used. This property of the material, which may be designated as its "elastically cohesive property", enables the composition to be extended to a marked degree upon the application of forces thereto, which upon the release of the latter permits the material to revert to its former form, while the material possesses the property of adhering to surfaces adjoining it with such tenacity that this extension takes place without releasing its hold on the surfaces in contact therewith.

While it is preferable that the rubber-like composition in accordance with the invention contain a minor proportion of rubber which may be reclaimed rubber, liquid latex, rubber crepe, new or reclaimed natural rubber, or synthetic rubber, the invention may be realized by the use of treated oils in the composition in lieu of the rubber ingredient. This rubber-like material is particularly adapted to be placed between wall structures or facings of various kinds which are to be rendered impervious against the ingress of moisture and the surface of which may be moved vertically or horizontally without affecting or breaking the seal.

In addition to its application in expansion joints, the material is particularly useful for roof structures where flashings are pulled away, the waterproofing of crevices in the walls, expansion joints in swimming pools, monolithic structures of various types, as a saturant or coating for fabrics employed for waterproofing purposes, as an elastic bond, or as a preparation for emulsions to be used for different purposes. The material in accordance with the present invention remains elastic at temperatures as low as 0° to 15° F. and can be twisted, pulled and compressed at such temperatures. The material effects a bond with concrete facings and can be elongated under tension without separating or loosing its hold on the facings to which the same is attached.

When rubber forms a constituent part of the composition in accordance with the present invention, a definite temperature limit must be observed in reducing the composition to a liquid state for pouring in this state in order that the rubber factor not be affected deleteriously. A heating range of 400 to 450° F. is adequate to heat the material to a temperature not to exceed 428° F. to maintain the pouring temperature of the material at approximately 400° F.

The material lends itself to use with other expansion joint materials in view of its yieldability and adhesive properties, and economies result from the use of sealing strips or other small strips of the material in accordance with the present invention in combination with major structural units. Such combined materials are adapted for use wherever an effective bond or sealing at only a limited portion of the expansion joint is necessary, at which portion the novel composition disclosed herein may be applied. Thus a depth of the sealing material of 1" to 1½" is effective in lieu of 8" to 10" normally required for an expansion joint filler.

A sample of the material in accordance with the present invention exhibits generally the following properties:

(a) Pouring fluidity (pour point): Shall not exceed a temperature of 400° F.

(b) Melting time: Shall not exceed 30 minutes.

(c) Cold adhesion test: Positive.

(d) Flash point: More than 550° F.

(e) Penetration, in centimeters at 77° F. 150 gram, 5 sec.; 0.45 to 0.75. At 32° F., 200 gram, 60 sec.: More than 0.28.

(f) Flow in centimeters, 5 hours at 140° F. at 75° angle: 0.5 maximum.

(g) Bond test, 5 cycles at 0° F: Shall not crack or break its bond.

(h) Softening point degrees F.: Above 160° F.

(i) Ageing test: Must not absorb oxygen after 24 hours in oxygen bomb.

The material in accordance with the present invention does not pass through any critical melting points, but passes through a range of varying viscosity. The degree of heating to which the material must be brought in order to pour the same is largely dependent upon the weather conditions at which the same is poured. It passes from a solid state to a soft state and is melted to a viscous liquid and finally to a thin liquid well adapted to pouring at a temperature not to exceed 400° F. The flash point of this material is above 600° F. when prepared with rubber.

The material in accordance with the present invention shows marked inert chemical properties as respects oxidation which renders it well suitable in its applications to paving or other outdoor uses since the life of the material is affected by time to a minimum degree.

The composition in accordance with the present invention consists essentially of bituminous or asphaltic material combined with rubber or the equivalent thereof, resins, stabilizers and fillers.

The asphaltic material is preferably compounded from two fractions, one known as G300 and the other as 9A. The former is a hard brittle asphalt. Its melting point approximates 170 to 180° F. and the ductility at 77° F. is 0.25 cm. per min. approximately 25—35. The latter asphalt, of a consistency of taffy, has a melting flow point of 90° F., flash point 600—640, viscosity 210 at 393° F. and specific gravity .988 at 60°. The mineral filler may be clays, vermiculite, asbestos fiber or mica; and the flow retarder may be litharge, calcium hydroxide and the like. Any type of rubber may be used in my composition such as crepe, sponge, reclaimed rubber of any kind, synthetic rubber or rubber substitute, so long as it has the characteristics of rubber. There are many synthetic rubbers and rubber substitutes being developed at the present time which can be used for this ingredient. Many of the treated oils are being developed as rubber substitutes. Some of these may be linseed oil, soy bean oil, sesame, castor oil, rape seed oil or turpentine, vulcanized by the aid of sulphur or organic or inorganic acids. Following are examples of the resins which may enter into the composition; Abalyn, a thin liquid obtained from rosin; hydrogenated methyl abietate; polymerized chloroprene; rubbery polymerized aliphatic hydrocarbons; trycresyl phosphate; or dibutyl phthalate; and, cumar P.10 which is a synthetic resin obtained from coal tars or any of the coumarone-indene resins of which there are many and which are obtained from coke oven distillates which contain the reactive aromatic hydrocarbons, coumarone and indene; or ethyl cellulose may be used.

Preferably the composition is compounded from two batches. The principal batch constituting approximately 40% of the whole mixture is formed by 3½ to 5% of rubber, 35 to 40% of asphalt of the grade designated as G300, and ½ to 1% of Abalyn or equivalent plasticizing agent. This main batch is mixed thoroughly with the application of heat and the auxiliary batch is added thereto. The latter may consist of 35 to 40% asphalt of the grade designated 9A, 5 to 10% of a filler such as vermiculite or the products noted above, and 1 to 3% of calcium hydroxide or equivalent flow retarder.

While different types of rubber have proven most practicable in the compounding of my improved composition, treated oils may be used as substitutes therefor, the combination of which with the asphaltic materials produces a rubber-like base. Examples of such oils are set forth above.

The melting point of the product outlined is approximately between 400° and 428° F. This melting point may be dropped by adding a slight percentage of water, for instance 1%, or even ½%, the water aiding in the breakdown under the heating process. But, of course, it would be eliminated through the heating of the material. The moisture may be incorporated either by crystallized chemicals, by incorporation of moisture in the final mixture when the material has been reduced to a temperature below that at which water evaporates. Likewise this base material may be combined with volatile and evaporable solvents, spirits, other thinners or reducers which will enable the base material to be used as paints, emulsions, varnishes, etc.

Different types of asphalt may be employed to either increase or decrease the quantities of materials used, and other things must be taken into consideration such as the oxidizing of the product when subjected to air, as the material would undoubtedly be employed more in outside work where it would be necessary to guard against oxidation.

Likewise synthetic resins or plastics formulas may be substituted, depending upon how and where the product is to be employed. Such additional products may be utilized either in combination with one of the types of rubber, or for certain uses may take the place of rubber. Likewise the addition of synthetic rubbers may impart qualities different and more favorable for certain uses, such as acid resistance, heat resistance, etc.

Variations in the compounding of the product in accordance with the invention may be made without departing from the spirit of the invention as defined in the annexed claims.

I claim:

1. A combined bituminous and rubber composition formed of a batch compounded of a minor proportion of rubber, not less than 3½%, 35 to 40% of an asphaltic material having a melting point of about 170° F. to 180° F., ½ to 1% of a plasticizing agent, 35 to 40% of an asphaltic material of a different grade having a flow point of about 90° F., 5 to 10% of a mineral filler, and 1 to 3% of a flow retarding agent, forming a homogeneous composition characterized by a high degre of yieldability, elasticity, cohesiveness and adhesive tenacity.

2. A combined bituminous and rubber composition formed of a batch compounded of a minor proportion of rubber, not less than 3½%, 35 to 40% of a hard brittle asphalt having a melting point of about 170–180° F., ½ to 1% of a plasticizing agent, 35 to 40% of a soft asphalt having a flow point of about 90° F., 5 to 10% of a mineral filler, and 1 to 3% of a flow retarding agent selected from the group consisting of litharge and calcium hydroxide, forming a homogeneous composition characterized by a high degree of yieldability, elasticity, cohesiveness and adhesive tenacity.

3. The method of compounding a bituminous and rubber composition which comprises mixing a batch composed of a minor proportion of rubber, not less than 3½%, 30 to 35% of a hard brittle asphalt having a melting point of about 170° F. to 180° F., and ½ to 1% of a plasticizing agent, mixing a second batch composed of 35 to 40% of a soft asphalt having a flow point of about 90° F., a mineral filler and a flow retarder, and mixing the batches with the addition of approximately 5 to 10% of the first asphalt at the time of mixing, to form a homogeneous composition characterized by a high degre of yieldability, elasticity, cohesiveness and adhesive tenacity.

4. The method of compounding a bituminous and rubber composition which comprises mixing a batch composed of a minor proportion of rubber, not less than 3½%, 30 to 35% of a hard brittle asphalt having a melting point of about 170° F. to 180° F., and ½ to 1% of a plasticizing agent, mixing a second batch composed of 35 to 40% of a soft asphalt having a flow point of about 90° F., 5 to 7% of a mineral filler, and 1 to 3% of a flow retarder, and mixing the batches with the addition of approximately 5 to 10% of the first asphalt at the time of mixing, to form a homogeneous composition characterized by a high degree of yieldability, elasticity, cohesiveness and adhesive tenacity.

5. The method of compounding a bituminous and rubber composition which comprises mixing a batch composed of a minor proportion of rubber, not less than 3½%, 30 to 35% of a hard brittle asphalt having a melting point of about 170–180° F., and ½ to 1% of a plasticizing agent, mixing a second batch composed of 35 to 40%, of a soft asphalt having a flow point of about 90° F., 5 to 7% of a mineral filler, and 1 to 3% of a flow retarder selected from the group consisting of litharge and calcium hydroxide, and mixing the batches with the addition of approximately 5 to 10% of the first asphalt at the time of mixing, to form a homogeneous composition characterized by a high degree of yieldability, elasticity, cohesiveness and adhesive tenacity.

ALBERT C. FISCHER.

REFERENCES CITED

The following references are of record in the file of this patent:

UNITED STATES PATENTS

| Number | Name | Date |
| --- | --- | --- |
| 580,139 | Morison | Apr. 6, 1897 |
| 1,751,848 | Winkelmann | Mar. 25, 1930 |
| 1,824,220 | Mackey | Sep. 22, 1931 |
| 1,911,139 | Fischer | May 23, 1933 |
| 2,066,459 | Dillehay | Jan. 5, 1937 |
| 2,215,383 | Warner | Sep. 17, 1940 |
| 2,323,435 | Wiseblood | July 6, 1943 |